Patented Nov. 7, 1950

2,528,832

UNITED STATES PATENT OFFICE 2,528,832

METHOD OF PREPARING AND PACKAGING BACON

Otto C. Johnson, Chicago, Ill., assignor to Continental Can Company, Inc., New York, N. Y., a corporation of New York No Drawing. Application February 6, 1946, Serial No. 645,965

8 Claims. (Cl. 99—174)

Bacon is a pork product which has been produced for a long time. The swine belly is trimmed and graded as to size, and then is submerged in a pickling or curing liquor which is a brine to which often sodium nitrite and sugar have been added, or is treated by rubbing salt mixtures into the surface of the meat. This curing requires 20 to 30 days and has the purpose of preventing decomposition and of producing a salty taste in the final product. The cured slab or side is washed, and then is suspended in a place (commonly called a smoke house) where it is surrounded with smoke for 18 to 24 hours at 120 to 150 degrees F., for the purpose of increasing its resistance to rancidification and to provide the customary smoked flavor. These cured and smoked slabs are then cooled, stored and sold; it is a common packer's or butcher's practice to trim off the rind and to slice before sale. The customer then prepares the slices for consumption by heating in a frying pan, whereby a large amount of fat is fried out and the residue is cooked, usually with a considerable distortion or "curling." These slabs have an unsatisfactory shelf or storage life, even with normal refrigeration, the quality becoming very poor in 6 to 8 weeks; and cannot be kept in open refrigeration chambers with flavor-sensitive products such as butter, etc., and even with some other meats, owing to the tainting effects of volatile smoke constituents. Ready-sliced bacon has poorer keeping quality than slab bacon.

It has also been a practice to preserve the cured and smoked sides, with the throught of preventing soilage of the bacon by extraneous dirt and soilage of adjacent things by the oily grease of the bacon, by placing in tin containers and sealing hermetically by soldering. In such cases, one procedure has included heating to process the contents: with the attendant melting of fats so that the packaged bacon becomes a solid block with large amounts of fats, which are more or less solid (depending upon the temperature at the time of opening), filling the spaces at the part of the container which was lower during the heating. Another practice has been to employ a very large amount of salt before so packaging and sealing, without later processing; but in such cases the material is too objectionably salty for employment if the usual product is available.

Such procedure of smoking the sides, which in cross-section correspond to the length and width of the slice, or may be a multiple of this, requires a long time amounting to hours or days; and even then the smoke penetration is low, particularly as the rind is retained as protection of the meat; the penetration at parts not protected by the rind is roughly around ⅜ of an inch. Hence, a large stock must always be in process; and the required treating space is large. The volume of smoke for the necessary surface concentration of the meat is large, and the consumption of leaves, wood, etc., for making the smoke is great. The presence of the large amount of fat, later to be fried away, represents an economic loss of much of such fats and of the smoke flavoring constituents therein; and the necessary cooking operations require time and fuel for the preparation of the edible product.

It has been found that a more flavorful product, capable of direct consumption from the opened container, and able to withstand lengthy storage under high temperature conditions, can be prepared economically by departing from prior practices in several respects. The expense and long time for obtaining even a scant amount of smoke penetration, the inconvenience of local cooking, and the troubles by bulk and weight of excess fats, can be offset by slicing the cured bacon, after trimming and before smoking; subjecting the individual slices to smoking, so that the available superficial area for smoke absorption is vastly multiplied and a more even distribution of the smoke components over the volume of the slice occurs; and cooking the slices individually preferably within a restraining device from which the fried-out fat can escape but which acts to prevent the curling or twisting during cooking. The cured, smoked and cooked slices are then packed in containers, evacuated to remove oxygen, and replacement with inert gas effected; the containers are then sealed, and are ready for storage, shipment and sale.

As an example of practice, a belly is cured by use of salt, sugar and sodium nitrite in the usual way and in the usual quantities. The dry cured product is washed, and the rind is removed: the slab is chilled and formed in a press, and then passed through a slicing machine. The individual slices are then arranged singly on a perforated or reticulate surface such as a grid or woven belt and introduced to a smoking chamber and exposed to smoke while heating at 100 to 160 degrees F. for 4 to 5 minutes. The smoked slices are subjected to cooking 3 to 5 minutes at about 450 degrees F., for example while confined at the larger surfaces by upper and lower woven belts, which prevent curling or distortion of the slices as they move individually through the hot zone and which permit the melted fats to drain from the meat. A further drainage for a substantially like time is allowed; and then the slices are removed from confinement in the form of flat pieces of cured, smoked and cooked bacon from which substantially 50 percent or more of the original weight of the cured and smoked slice has been fried out, each piece having a regular and flat-sided shape so that they can be conveniently and compactly introduced into cans or like sealable containers. These containers are then vacuumized to around one pound pressure, absolute; and then an inert gas such as carbon dioxide or nitrogen is admitted, and the covers are seated and sealed.

The operations of smoking, cooking and draining can be combined in a continuous process for example by bringing the slices, as they fall from the slicing knife, onto a woven or chain conveyor of small mesh (for example, 16 strands per inch), and bringing an upper conveyor of like type onto the top of the slices, and advancing the conveyors with the spaced individual slices held therebetween through a chamber for a transit time of say 10 minutes; this chamber being essentially closed and supplied with smoke from a charring furnace, and having heating means capable of bringing the slices to the cooking temperature after they have been in the chamber for 2 or 3 minutes and of holding the slices at this temperature for 4 or 5 minutes. The passage through the rest of the chamber provides for drainage and a partial cooling.

Because the slices are exposed to the smoke for a shorter time and a greater absorption of smoke components occurs, the efficiency of the smoking operation, considered on the basis of operating space, equipment, labor and smoke required for producing a defined level of concentration of smoke components, is higher than with the customary smoking of bacon slabs, and the smoke components are more uniformly distributed relative to the volume of the meat. Thus, a lesser quantity of wood, leaves, etc. is required for smoking the bacon: and more desirable woods, such as hickory sawdust can be used at the same overall cost of smoking.

The product in its cured and smoked condition is essentially free of inedible fats, and its weight for packing and shipping is low, being in preferred practice about one-half or less of the weight of the cured product. The smoke constituents appear uniformly distributed over the entire cut surface of the slice, rather than being localized in the edge portions as in ordinary sliced bacon. The product is edible in the condition as it comes from the package, and can be eaten cold or upon warming. After months of storage, the package can be opened and the contents warmed, whereupon the product cannot be distinguished from the freshly fried bacon as placed in the container.

Among the practices described above, a conjoint smoking and cooking occurs; and it appears that cooking during smoking is desirable as this develops a part of the flavor by heating the fats and meat in the presence of the smoke components: while the continuation of the smoking, even after cooking is completed, represents an assurance of deposit of smoke components to the desired degree and with the use of the short times of total smoke treatment.

It is obvious that the invention is not limited to the practice described above, but that the same may be employed in many ways within the scope of the appended claims.

I claim:

1. The method of preparing bacon for preservation and merchandising which comprises slicing a slab of cured pork, and thereafter individually exposing the slices to smoke over essentially the entire superficial areas thereof, and cooking the slices while individually restraining the same at their larger surfaces to prevent distortion during cooking.

2. The method of preparing bacon for preservation and merchandising which comprises slicing a slab of cured bacon and thereafter individually exposing the slices to smoke over essentially the entire superficial areas thereof, and cooking the slices while restraining the same at their larger surfaces to prevent distortion during cooking.

3. The method of preparing bacon for preservation and merchandising which comprises slicing a slab of cured pork, and thereafter individually exposing the slices to smoke over essentially the entire superficial areas thereof, and cooking the slices essentially simultaneously with the smoking operation while restraining the same at their larger surfaces to prevent distortion during cooking.

4. The method of packaging bacon for preservation and merchandising which comprises slicing a slab of cured pork, subjecting the slices individually to smoking and cooking operations, said cooking being accomplished while restraining the slices at their larger surfaces to prevent distortion during cooking, placing the cooked flat slices in a packaging container, evacuating the free spaces of the container and slices, admitting an inert replacement gas, and sealing the container with the replacement gas therein.

5. The method of preparing bacon for preservation and merchandising which comprises cooking a slice of cured pork and exposing the slice to smoke over essentially the entire superficial area thereof.

6. The method of preparing bacon for preservation and merchandising which comprises slicing a slab of cured pork, and thereafter individually exposing the slices to smoke over essentially the entire superficial areas thereof, and cooking the slices essentially simultaneously with the smoking operation.

7. The method of preparing bacon for preservation and merchandising which comprises slicing a slab of cured pork, and thereafter individually exposing the slices to smoke over essentially the entire superficial areas thereof, and cooking each slice during a part of the time while it is exposed to smoke.

8. The method of packaging bacon for preservation and merchandising which comprises slicing a slab of cured pork, subjecting the slices individually to smoking and to cooking at approximately grilling temperature, placing the cooked and smoked slices in a packaging container, evacuating the free spaces of the container and slices, admitting an inert replacement gas, and sealing the container with the replacement gas therein.

OTTO C. JOHNSON.

REFERENCES CITED

The following references are of record in the file of this patent:

UNITED STATES PATENTS

| Number | Name | Date |
|---|---|---|
| 954,535 | Moore | Apr. 12, 1910 |
| 1,006,175 | Appleboom | Oct. 17, 1911 |
| 1,667,574 | Turner | Apr. 24, 1928 |
| 1,711,372 | Carter | Apr. 30, 1929 |
| 1,789,946 | Rector | Jan. 20, 1931 |
| 2,131,181 | Kantor | Sept. 27, 1938 |
| 2,140,163 | McKee | Dec. 13, 1938 |
| 2,176,144 | Moskowitz et al. | Oct. 17, 1939 |
| 2,388,823 | Britt | Nov. 13, 1945 |